Patented Nov. 18, 1947

2,431,285

UNITED STATES PATENT OFFICE 2,431,285

PROCESS FOR PREPARING 1-(DIHYDROXY-PHENYL)-2-AMINO BUTANOL-1 AND INTERMEDIATES

Chester Merle Suter and Arlo Wayne Ruddy, Albany, N. Y., assignors, by mesne assignments, to Winthrop-Stearns Inc., New York, N. Y., a corporation of Delaware

REISSUED

APR 19 1949

No Drawing. Application March 16, 1944, Serial No. 526,809

16 Claims. (Cl. 260—570.6)

This invention relates to therapeutic agents having a vasoconstrictor action, intermediates useful in the production thereof and to improved methods for their preparation.

It has been found that the compound having the formula

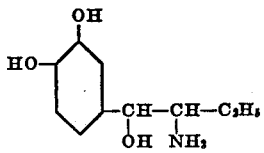

and known chemically as 1-(3,4-dihydroxyphenyl)-2-amino-1-butanol, has especially advantageous properties which make it a peculiarly useful vasoconstrictor agent. In particular, it is equally as effective as epinephrine in the relief of acute asthmatic attacks in doses ½ larger and the relief is accompanied by fewer side-effects. This compound is approximately only 1/100 as toxic as epinephrine. The compound enjoys the unique and especially valuable property of exerting its action without exciting the central nervous system nor raising the systolic blood pressure. Instead, it lowers the diastolic blood pressure and increases the pulse rate, thus improving circulation without a proportionate rise in cardiac work. These highly desirable properties are enjoyed not only by the compound 1-(3,4-dihydroxyphenyl)-2-amino-1-butanol itself, that is in the form of the free base, but also in the form of its acid addition salts. Such acid addition salts include the hydrochloride, the sulfate, the tartrate, and in general all of its other salts with acids which are themselves non-toxic to the organism in dosages corresponding to the therapeutic dose of the amine salt.

We have set ourselves to the problem of developing a satisfactory procedure by which this drug may be manufactured and made available to the medical profession. In searching for suitable means of obtaining this amine, the usual methods for preparing arylalkanolamines proved to be unsatisfactory.

Now we have found, however, that the compound or its salts can be prepared readily and economically by reacting a compound newly discovered by us and having the formula

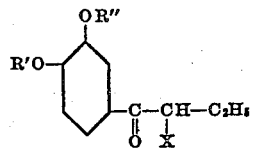

where R' and R'' are arylmethyl, and X is a middle halogen, i. e., chlorine or bromine, with a primary amine having the formula R—NH₂, where R is diarylmethyl, and hydrogenating the resulting (diarylmethyl)-amino ketone or an acid addition salt thereof in the presence of a noble metal, preferably palladium, catalyst.

We prefer to conduct our new process by heating α-bromo-3,4-dibenzyloxybutyrophenone with benzhydrylamine. The resulting α-benzhydrylamino-3,4 - dibenzyloxybutyrophenone is converted into an acid addition salt such as the hydrochloride, by treating the free base with the requisite amount of acid. This salt is dissolved in a suitable solvent such as alcohol and hydrogenated in the presence of a palladium catalyst. After three moles of hydrogen are absorbed, the product, α-amino-3,4-dihydroxybutyrophenone can be isolated. On further hydrogenation, this is reduced to 1-(3,4-dihydroxyphenyl)-2-amino-1-butanol. Thus the two benzyl groups and the benzhydryl group are removed by hydrogenolysis, while the ketone group is reduced to the desired hydroxyl group. In this connection it must be observed that 1-(3,4-dihydroxyphenyl)-2-amino-1-butanol is theoretically capable of existing in two racemic forms since the carbon atoms numbered 1 and 2 in the above formula are both asymmetric and different. It is quite surprising that only one kind of racemate is formed according to our new process and that this racemate is the one desired and having the favorable physiological and therapeutic properties.

Our invention also contemplates new intermediates especially useful for the preparation of 1-(3,4-dihydroxyphenyl)-2- amino -1- butanol.

These intermediates are aminoketones having the formula

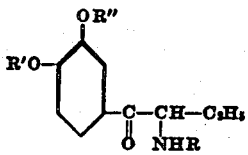

where R is a member of the class consisting of hydrogen and diarylmethyl and R' and R'' are members of the class consisting of hydrogen and arylmethyl, and the acid addition salts of these new amino-ketones.

Our invention is further illustrated by the following example, but without being restricted thereto.

EXAMPLE (a) *3,4-dihydroxybutyrophenone*

To 165 gm. of catechol in 660 cc. of dry chlorobenzene is added 200 gm. of n-butyryl chloride, and the mixture heated at 50° C. for 30 minutes. It is then cooled and 426 gm. of anhydrous aluminum chloride is added in small portions. Then the temperature of the mixture is gradually raised to 100° C. and held there for 3 hours. The mixture is hydrolyzed by pouring it onto ice and hydrochloric acid, and the chlorobenzene removed by steam distillation. While the mixture is still warm, 75 cc. of concentrated hydrochloric acid and 125 cc. of toluene are added. After thorough cooling, the deposited solid is collected by filtration and washed well with water and toluene. After recrystallization from water, this product, 3,4-dihydroxybutyrophenone, melts at 146–146.5° C.

(b) *3,4-dibenzyloxybutyrophenone*

A mixture of 184.5 gm. of 3,4-dihydroxybutyrophenone, 278.5 gm. of benzyl chloride, 187 gm. of anhydrous potassium carbonate, 13.5 gm. of sodium iodide in 500 cc. of alcohol and 8 cc. of water is refluxed and stirred for 5 hours when all effervescence has ceased. The alcohol is distilled off and any unreacted benzyl chloride removed by steam distillation. The warm mixture is poured into dilute sodium hydroxide, cooled, filtered, and washed with water until neutral to litmus. Recrystallization from alcohol gives a 90% yield of 3,4-dibenzyloxybutyrophenone, M. P. 86–87° C.

(c) *α-Bromo-3,4-dibenzyloxybutrophenone*

To 335.5 gm. of 3,4-dibenzyloxybutyrophenone dissolved in 1500 cc. of methylene chloride is added 110 gm. of powdered calcium carbonate and then 149 gm. of bromine in 400 cc. of methylene chloride. The excess calcium carbonate is dissolved with dilute hydrochloric acid, the methylene chloride layer separated, washed with water, and dried over sodium sulfate. After removing the solvent under reduced pressure, the residue is recrystallized from alcohol. A 70% yield of cream-colored crystals, M. P. 100–101° C., is obtained.

(d) *α - Benzhydrylamino-3,4-dibenzyloxybutyrophenone hydrochloride*

To 57.1 gm. of α-bromo-3,4-dibenzyloxybutyrophenone in 175 cc. of absolute alcohol is added 47.7 gm. of benzhydrylamine and the mixture refluxed three hours. The alcohol is completely removed under reduced pressure and 400 cc. of dry ether added. The precipitated benzhydrylamine hydrobromide is filtered and washed with dry ether. The ether solutions are combined and thoroughly shaken with 10% hydrochloric acid. An oil separates and crystallizes slowly. It is filtered off, washed with water and with ether to remove traces of color. A 75% yield of cream-colored needles, M. P. 175–176° C., with decomposition, is obtained.

(e) *1-(3,4-dihydroxyphenyl)-2-amino-1-butanol hydrochloride*

To 28.9 gm. of α-benzhydrylamino-3,4-dibenzyloxybutyrophenone, dissolved in 150 cc. of absolute alcohol, is added 0.5 gm. of palladium sponge catalyst, prepared according to the method of Willstätter and Waldschmidt-Leitz (Berichte 54, 123, 1921). The mixture is shaken at 55–70° C. under fifty pounds pressure until three equivalents of hydrogen have been used. After the alcohol is removed, the residue is dissolved in water and the toluene and diphenylmethane removed by extracting with ether. The aqueous solution is boneblacked and further hydrogenated until the fourth equivalent of hydrogen has been used. The catalyst is removed and the solution taken to dryness under reduced pressure. The residue is boneblacked in absolute alcohol, an equal volume of acetone added and then dry ether added until precipitation is complete. A 60% yield of colorless material is obtained. When completely dry it melts with decomposition at 199–200° C.

When the hydrogenation is interrupted after the absorption of three moles of hydrogen and the reaction mixture worked up at this point, by evaporating the alcohol, dissolving the residue in water, and rendering the aqueous solution alkaline by addition of aqueous ammonia, α-amino - (3,4-dihydroxyphenyl) -butyrophenone is obtained. It melts at 187–188° C., with decomposition, and forms a hydrochloride melting at approximately 178–179° C., with decomposition. This salt, and other acid addition salts, can be prepared by adding the requisite acid to an alcoholic suspension of the base, and isolating the salt by evaporation or by precipitation with ether.

It will be appreciated that our invention is subject to numerous variations with regard to the particular details involved in the various steps. For example, instead of using benzyl groups to protect the phenolic hydroxyl groups during halogenation, we can employ other protecting arylmethyl groups such as p-chlorobenzyl, p-methoxybenzyl, p-methylbenzyl, or the like.

Similarly, instead of using benzhydrylamine as the α,α-diarylmethylamine, we can use derivatives of benzhydrylamine in which one or both benzene rings are substituted by unreactive groups such as halogen, alkyl or alkoxyl.

However, the use of substituted benzyl, and substituted benzhydryl compounds usually offers no advantage, and in practice we prefer to use the cheaper, ring-unsubstituted compounds.

Likewise, instead of using a bromoketone, we can also employ the corresponding chloroketone. In the appended claims we employ the term middle halogen to include both bromine and chlorine.

The noble metal catalyst can be any metal of the platinum group. We prefer palladium because it is cheaper than platinum, and affords a clean-cut hydrogenation, in contrast to some instances where we have found the hydrogenation difficult to control, when using platinum.

Because of these permissible variations we do not limit the scope of our invention to the specific forms shown. Rather, the scope is defined by the subjoined claims.

What we claim is:

1. The process which comprises reacting a compound having the formula

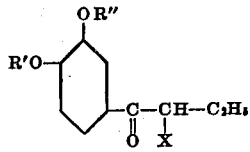

where R' and R'' are arylmethyl and X is a middle halogen, with an amine having the formula R—NH$_2$, where R is a diarylmethyl, and hydrogenating the resulting α-[(diarylmethyl)-amino]-ketone or an acid addition salt thereof in the presence of a noble metal catalyst, thereby producing a derivative of 1-(3,4-dihydroxyphenyl)-2-amino-1-butanol, or an acid addition salt thereof.

2. A process according to claim 1 where the noble metal catalyst is palladium.

3. A process according to claim 1 where the amine of formula R'—NH$_2$ is benzhydrylamine.

4. The process which comprises reacting α-bromo-3,4-dibenzyloxybutyrophenone with benzhydrylamine, forming an acid addition salt of the resulting α-benzhydrylamino-3,4-dibenzyloxy-butyrophenone by reacting the latter with an acid, and hydrogenating the resulting acid addition salt of α-benzhydrylamino-3,4-dibenzyloxybutyrophenone in the presence of a noble metal catalyst, thereby producing an acid addition salt of 1-(3,4-dihydroxyphenyl)-2-amino-1-butanol.

5. The process which comprises reacting α-bromo-3,4-dibenzyloxybutyrophenone with benzhydrylamine, forming the hydrochloride of the resulting α-benzhydrylamino-3,4-dibenzyloxybutyrophenone by reacting the latter with hydrochloric acid, and hydrogenating the resulting hydrochloride of α-benzhydrylamino-3,4-dibenzyloxybutyrophenone in the presence of a palladium catalyst, thereby producing the hydrochloride of 1-(3,4-dihydroxyphenyl)-2-amino-1-butanol.

6. In a process for producing 1-(3,4-dihydroxyphenyl)-2-amino-1-butanol and its acid addition salts, the step which comprises reacting a compound having the formula

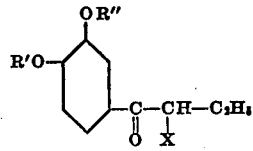

where R' and R'' are arylmethyl and X is a middle halogen, with an amine having the formula R—NH$_2$, where R is a diarylmethyl.

7. In a process for producing 1-(3,4-dihydroxyphenyl-2-amino-1-butanol and its acid addition salts, the step which comprises reacting α-bromo-3,4-dibenzyloxybutyrophenone with benzhydrylamine.

8. In a process for producing 1-(3,4-dihydroxyphenyl)-2-amino-1-butanol and its acid addition salts, the step which comprises hydrogenating, in the presence of a noble metal catalyst, a member of the class consisting of a compound having the formula

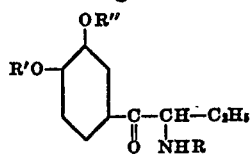

where R' and R'' are arylmethyl, and R is diarylmethyl, and acid addition salts of said compound.

9. A process according to claim 8 wherein the noble metal catalyst is palladium.

10. In a process for producing 1-(3,4-dihydroxyphenyl-2-amino-1-butanol and its acid addition salts, the step which comprises hydrogenating α-benzhydrylamino -3,4- dibenzyloxybutyrophenone in the presence of a palladium catalyst.

11. A compound having the formula

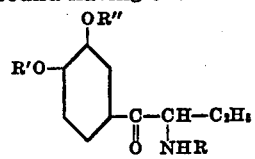

where R is a member of the group consisting of hydrogen and diarylmethyl and R' and R'' are members of the group consisting of hydrogen and arylmethyl, and the acid addition salts of said aminoketones.

12. A compound having the formula

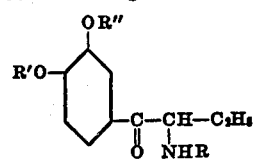

where R is diarylmethyl and R' and R'' are arylmethyl.

13. α - Benzhydrylamino- 3,4- dibenzyloxybutyrophenone, having the formula

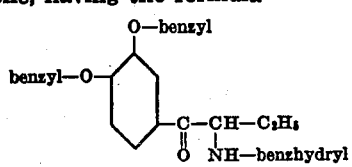

and forming a hydrochloride melting at approximately 175–176° C., with decomposition.

14. α-Amino-3,4-dihydroxybutyrophenone, having the formula

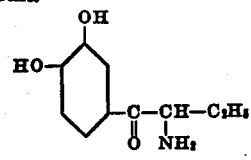

and melting at approximately 187–188° C. with decomposition.

15. An acid addition salt of α-amino-3,4-dihydroxy-butyrophenone.

16. α-Amino-3,4-dihydroxybutyrophenone hydrochloride, melting at approximately 178–179° C. with decomposition.

CHESTER MERLE SUTER.
ARLO WAYNE RUDDY.

REFERENCES CITED

The following references are of record in the file of this patent:

UNITED STATES PATENTS

| Number | Name | Date |
| --- | --- | --- |
| 1,957,092 | Bockmuhl I | May 1, 1934 |
| 2,083,001 | Bockmuhl II | June 8, 1937 |